No. 854,662. PATENTED MAY 21, 1907.
I. MOSCICKI.
ELECTRIC CONDENSER.
APPLICATION FILED FEB. 17, 1904.
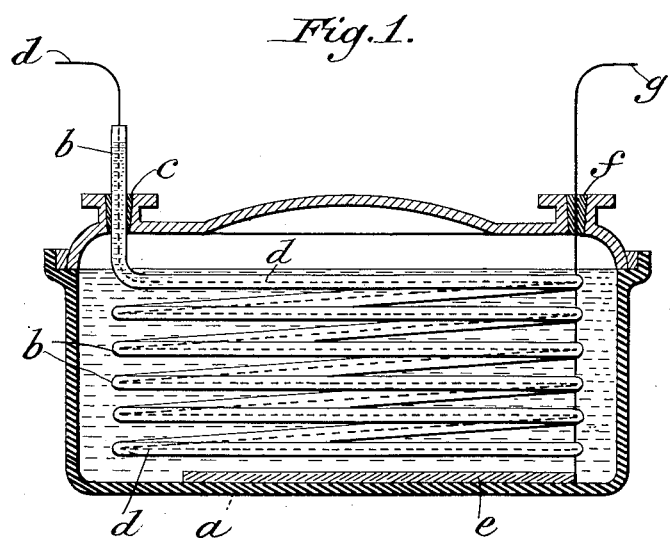
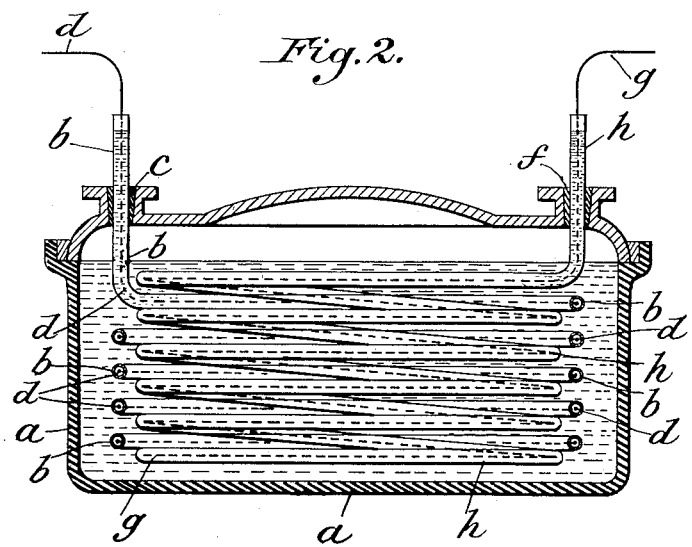
WITNESSES:
F. H. Schott
Edwin G. Balinger.
INVENTOR
Ignacy Moscicki
By
Georgii Massie
His Attorneys

UNITED STATES PATENT OFFICE.

IGNACY MOSCICKI, OF FRIBOURG, SWITZERLAND.

ELECTRIC CONDENSER.

No. 854,662.   Specification of Letters Patent.   Patented May 21, 1907.

Application filed February 17, 1904. Serial No. 194,027.

*To all whom it may concern:*

Be it known that I, IGNACY MOSCICKI, a citizen of Austria, residing at Fribourg, in the Republic of Switzerland, have invented certain new and useful Improvements in Electric Condensers; and I do hereby declare the following to be a full, clear, and exact description of the invention, such as will enable others skilled in the art to which it appertains to make and use the same.

This invention relates to a condenser the coating of which consists in the usual manner of electrolytic conductors. The novelty of this condenser is that one of its electrolytic coatings is contained in the interior of a tubular dielectric which is itself sunk in the other coating.

In the accompanying drawing Figures 1 and 2 are sectional elevations showing two forms of the invention.

In the form illustrated in Fig. 1 $a$ is a vessel made of insulating material, which contains a fluid electrolytic conductor such as sulfuric acid, potash lye, soda lye, etc. Into this, the electrolytic conductor which forms one coating of the condenser, a narrow tube $b$ closed at one end and made, for example, of glass, is dipped, the top of the tube $b$ passing through a junction $c$ of the vessel $a$ and the interior thereof likewise containing a fluid electrolytic conductor as an inner coating. This tube which acts as a dielectric is wound in spiral form so that while of considerable length it occupies exceedingly little space. A conducting wire $d$ made, for example, of lead runs through the whole interior length of the tube and projects from the top thereof. On the bottom of the vessel $a$ is an electrode plate $e$ made, for example, of lead and connected with a conducting wire $g$ (lead wire for instance) that runs through a junction $f$ of the vessel $a$. The two conducting wires $d$ and $g$ serve for connecting the two coatings with an external circuit. Owing to the conducting wire $d$ running through the whole length of the tube $b$ the resistance in this tube is greatly diminished.

In the form of the invention illustrated in Fig. 2 a second narrow tube $h$ made of glass for instance and closed at one end is immersed in the electrolytic conductor contained in the vessel $a$, the top of this tube running through the junction $f$ and likewise containing a fluid electrolytic conductor which acts as a coating. This tube $h$ which acts as a dielectric is like the tube $b$ wound as a coil and concentrically to that tube. Through the whole interior of the tube $h$ a conducting wire $g$ runs which projects from the top thereof and serves for connecting the electrolytic coating contained in the tube $h$ with an external circuit as well as for reducing the resistance in this tube. The electrolytic coating contained in the vessel $a$ is the external coating common to both of the tubes $b$ and $h$, so that this form of the invention represents two condensers arranged in series.

The tubular dielectric containing the one coating has the advantage over plate-shaped dielectrics in the absence of corners where the electricity becomes condensed; besides this, tubes are less easily broken. The coatings can be easily insulated from each other, as only the place where the tubular dielectric passes through the vessel $a$ needs to be insulated.

What I claim as my invention and desire to secure by Letters Patent is:

An electric condenser comprising a vessel of insulating material containing an electrolyte, two coiled tubular dielectrics, the coils of one surrounding the coils of the other, both being immersed in the electrolyte contained in the vessel, each tubular dielectric containing an electrolyte conductor, and conducting terminals inserted within the tubular dielectrics and immersed in the electrolytic conductors contained therein.

In testimony whereof I have affixed my signature to this specification, in the presence of two witnesses.

IGNACY MOSCICKI.

Witnesses:
EDUARD VON WALDKIRCH,
FRIEDRICH NAEGELI.